(12) United States Patent
Raghunath et al.

(10) Patent No.: US 8,973,098 B2
(45) Date of Patent: Mar. 3, 2015

(54) SYSTEM AND METHOD FOR VIRTUALIZED RESOURCE CONFIGURATION

(75) Inventors: Mandayam Thondanur Raghunath, Bangalore (IN); Marcel Catalin Rosu, Ossining, NY (US); Dinesh Chandra Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 2475 days.

(21) Appl. No.: 11/622,119

(22) Filed: Jan. 11, 2007

(65) Prior Publication Data
US 2008/0172492 A1 Jul. 17, 2008

(51) Int. Cl.
| | |
|---|---|
| H04L 29/10 | (2006.01) |
| G06F 15/16 | (2006.01) |
| H04L 29/12 | (2006.01) |
| H04L 12/46 | (2006.01) |
| H04L 29/06 | (2006.01) |

(52) U.S. Cl.
CPC .......... *H04L 61/2015* (2013.01); *H04L 12/467* (2013.01); *H04L 29/12283* (2013.01); *H04L 29/12924* (2013.01); *H04L 61/2061* (2013.01); *H04L 61/6063* (2013.01); *H04L 63/0272* (2013.01); *H04L 63/10* (2013.01); *H04L 63/20* (2013.01)
USPC ...... 726/3; 726/4; 726/13; 709/227; 709/228; 709/229

(58) Field of Classification Search
CPC ............ H04L 12/467; H04L 29/12283; H04L 29/12924; H04L 61/2015; H04L 63/20; H04L 61/6063; H04L 63/0272; H04L 63/10; H04L 61/2061
USPC ........ 713/182, 185, 186; 726/3, 4, 13, 26–28; 370/389; 709/227–229
See application file for complete search history.

(56) References Cited

U.S. PATENT DOCUMENTS

| | | | | |
|---|---|---|---|---|
| 5,751,967 | A * | 5/1998 | Raab et al. ................... | 709/228 |
| 6,061,334 | A * | 5/2000 | Berlovitch et al. ........... | 370/255 |
| 6,167,052 | A * | 12/2000 | McNeill et al. ............... | 370/399 |
| 7,228,345 | B2 * | 6/2007 | Larson et al. ................. | 709/222 |
| 7,568,107 | B1 * | 7/2009 | Rathi et al. .................... | 713/182 |
| 7,680,086 | B2 * | 3/2010 | Eglin ............................ | 370/338 |
| 7,702,732 | B1 * | 4/2010 | Squire et al. .................. | 709/206 |
| 2002/0009078 | A1 * | 1/2002 | Wilson et al. ................. | 370/389 |
| 2004/0103310 | A1 * | 5/2004 | Sobel et al. ................... | 713/201 |
| 2004/0250117 | A1 * | 12/2004 | Congdon ...................... | 713/201 |
| 2005/0286537 | A1 * | 12/2005 | Shimada .................. | 370/395.53 |

(Continued)

OTHER PUBLICATIONS

Kakiuchi et al., Illegal Access Prevention Technology by Authentication Virtual LAN, Apr. 2003, NEC Soft., pp. 192-196.*

(Continued)

*Primary Examiner* — Catherine Thiaw
(74) *Attorney, Agent, or Firm* — Tutunjian & Bitetto, P.C.; Preston J. Young (57) ABSTRACT

A system and method for configuring client access to a network includes at a first port, accessing a first server on a first local area network associated with the first port. An authorized local area network other than the first local area network is determined to which an authorized connection can be properly made based on information in a client request. The first port is assigned to the authorized local area network. Communications are handled with a new client configuration in the authorized local area network.

20 Claims, 5 Drawing Sheets

(56) References Cited

U.S. PATENT DOCUMENTS

| | | | |
|---|---|---|---|
| 2006/0015714 A1* | 1/2006 | Hirano et al. | 713/151 |
| 2006/0034272 A1* | 2/2006 | Kawakami et al. | 370/389 |
| 2006/0203815 A1* | 9/2006 | Couillard | 370/389 |
| 2007/0180152 A1* | 8/2007 | Montanez | 709/250 |
| 2007/0230457 A1* | 10/2007 | Kodera et al. | 370/389 |
| 2007/0237148 A1* | 10/2007 | Jabr et al. | 370/392 |
| 2008/0134296 A1* | 6/2008 | Amitai et al. | 726/4 |
| 2009/0241108 A1* | 9/2009 | Edwards et al. | 718/1 |
| 2009/0257437 A1* | 10/2009 | Tiwari | 370/395.53 |

OTHER PUBLICATIONS

"Port Based VLAN User's Guide" Cabletron Systems; Dec. 1997; 64 Pages.*

R. Droms, "Dynamic Host Configuration Protocol", Bucknell University, Mar. 1997; pp. 1-45.

M. Patrick, "DHCP Relay Agent Information Option", Motorola BCS; Jan. 2001; pp. 1-14.

\* cited by examiner

SYSTEM AND METHOD FOR VIRTUALIZED RESOURCE CONFIGURATION

BACKGROUND

1. Technical Field

The present invention relates to network system security and more particularly to systems and methods having cross-layer virtual resource configurations to provide proper security in a network environment.

2. Description of the Related Art

Network environments permit a mode of usage where a user brings a portable storage device and connects the device to a personal computer (PC), makes the PC boot from the portable storage device and subsequently resumes a suspended virtual machine so that the user of the portable device is able to access a personal computing state. The personal computing state may include the state of all running processes on any computer that the user can access. This mode of operation raises security exposure as far as the owner of the PC is concerned.

In particular, the PC may be connected to a network where there are other network resources and the owner of the PC may be concerned that the portable device may launch an attack on (or even simply obtain access to) these network resources. For example, consider the case where the PC is part of a corporate intranet, and the user is normally not authorized to connect to the corporate intranet. When the user boots the PC from the portable device, the user may be able to access intranet resources. The intranet implicitly trusts the PC since it is connected to a wall port on the corporate network. Even if the corporate network performs some sort of medium access control (MAC) address validation, the PC is still trusted since the PC belongs to the enterprise and is normally permitted access to intranet resources.

In other contexts, a similar problem arises when datacenters following a Universal Server Farm paradigm are deployed to be used among multiple customers. Machines are assigned to different customers, and dynamic provisioning and reprovisioning of servers and applications requires that machines be allocated at one time to a single customer and at other times to a different customer. The server is provided over to the control of an external entity, and cannot be fully trusted.

SUMMARY

A mechanism is needed to deal with the situation where a PC comes under the control of an external entity temporarily, such as when the PC is taken over by a guest user who boots the machine from external media. In this situation, it would be preferable to disable the PC's ability to access intranet resources. This may be provided by either completely disallowing network access, or in some cases permit the user to access limited resources, such as, e.g., public resources that are on the Internet. In such a case, the servers belonging to a customer need to be assigned onto their own virtual local area networks (VLAN) for isolation. Traditionally, the VLAN configuration needs to be done before the machines can be allocated to a customer. This step, which requires a manual operation, can be eliminated if a machine comes preloaded with a customer-provided boot image, or customer-specific boot image, and the system allocates the machine to a customer-specific VLAN automatically when booted up.

This disclosure describes systems and methods that can be used to automatically configure the network so that when a machine boots, it is automatically placed in a virtual network which is determined based on a level of trustworthiness of a software stack (of the accessing device).

A system and method for configuring client access to a network includes at a first port, accessing a first server on a first local area network associated with the first port. An authorized local area network other than the first local area network is determined to which an authorized connection can be properly made based on information in a client request. The first port is assigned to the authorized local area network. Communications are handled with a new client configuration in the authorized local area network.

A system for configuring client access to a network includes a plurality of local area networks and each of the local area networks being isolated from the others and each having a server and at least one access port associated therewith. A configuration module is configured to determine an authorized local area network from the plurality of local area networks suitable for connection to a device requesting access from a first access port. The configuration module is configured to assign the first access port, based on client information, to the authorized local area network wherein the authorized local area network is other than the local area network associated with the first access port.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

A system and method are provided to deal with the situation where a PC comes under the control of an external entity temporarily, such as when the PC is taken over by a guest user who boots the machine from external media. Servers are assigned onto their own virtual local area networks (VLAN) for isolation.

A network configuration for booted up machines may be provided by employing, e.g., a Dynamic Host Configuration Protocol or DHCP (a protocol for automating the configuration of computers that use TCP/IP). DHCP may be used to provide internet protocol (IP) level configurations for a machine when the machine boots up. The IP level communication mechanism is usually supported in all standard clients.

Isolation among different machines is preferably provided by virtual local area networks (VLANs), which provide the illusion of different physical networks for the purpose of security and isolation. DHCP servers are unaware of the VLAN or other underlying mechanisms underneath the IP layer. Therefore, a DHCP server may be on each VLAN, which provides an IP level configuration for machines on their own subnet.

In accordance with preferred embodiments, a DHCP level auto-configuration mechanism may be combined with a VLAN configuration scheme at a lower layer. A client stack carries (e.g., as a DHCP extension) a token that identifies its trustworthiness. In addition to giving the machine the right set of IP level configurations, the DHCP server also invokes a VLAN configuration routine which places a port where the machine connects into a different VLAN depending on the configuration policies that are present at the server. Thus, present principles include cutting across two layers of a network configuration to obtain the isolation of a machine and maintain security of a network or networks as will be further described herein.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present principles will be described in terms of illustrative embodiments. In one embodiment, a system will be described where a portable device is employed to access a network by booting up a PC. Another embodiment will be described in terms of a hosting center.

Figure 1:
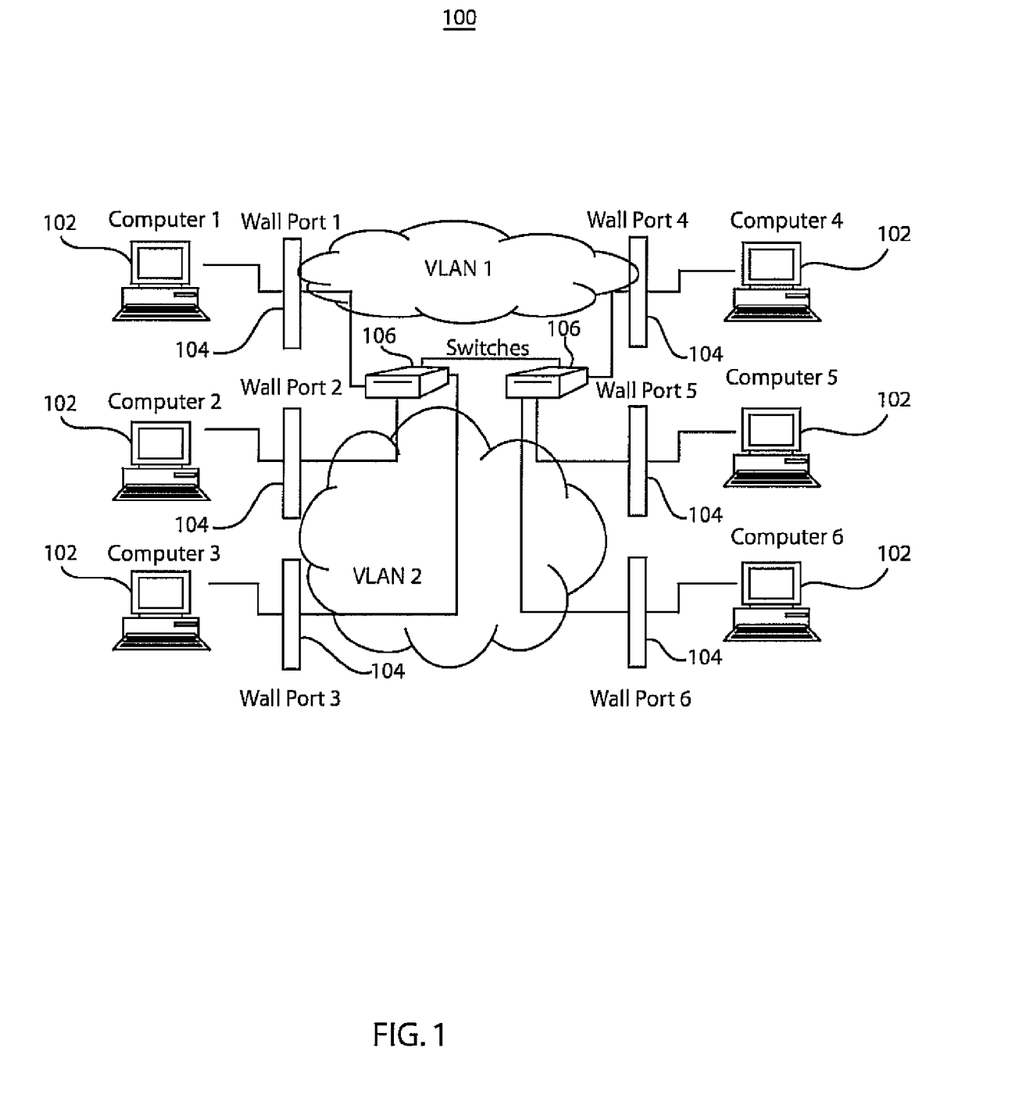
FIG. 1 is a schematic diagram of a network infrastructure.

Referring now to the drawings in which like numerals represent the same or similar elements and initially to FIG. 1, an illustrative building network infrastructure 100 is shown in accordance with one embodiment. A plurality of computers 102 each labeled computer 1-computer 6 are each connected to a port 104 labeled wall port 1-wallport 6. In a building's network infrastructure 100, the ports 104 are connected to a switch or switches 106 which provide network connectivity to a larger building network. The switches 106 are capable of supporting a VLAN configuration within the network.

There are multiple VLANs 108 supported within the building 100, as an example one VLAN (VLAN 1) is for trusted computers, a second VLAN (VLAN 2) is for visitors, a third VLAN (VLAN 3) is for computers running secure business processes and a fourth VLAN (VLAN 4) is for senior executives (or the highest level of security). FIG. 1 shows two VLANs (VLAN 1 and VLAN 2). VLAN 1 connects wall ports 1 and 4, and VLAN 2 connects wall ports 2, 3, 5 and 6.

Traditionally, the mapping of ports to a VLAN is done statically, and is changed by means of manual processes when someone changes offices, when a new VLAN is introduced, or when network reconfiguration is performed. However, this enables computers in the building 100 to access a different VLAN by simply switching to a different port and does not provide effective isolation of any users. Thus, computers 1 and 4 are in VLAN 1, and computers 2, 3, 5 and 6 are in VLAN 2. However, if computer 1 is unplugged from wall port 1 and plugged into wall port 2, it would become a member of VLAN 2. The association of computers to VLANs is done by means of the port to which they are connected (statically determined in advance).

In an environment where the port's physical access can be associated with the trustworthiness of computers plugging in, this mechanism works well. Thus, in existing offices or cubicles, machines belonging to owners can be mapped to the port near their workspace and the VLAN mapping is provided in a semi-static manner. However, when mobile employees connect at a mobility center, they are typically joining a single untrusted VLAN, and cannot access the secure VLAN to which they may be entitled. There is security exposure when an executive who should always connect to a trusted VLAN connects to a wall-port which is untrusted.

Figure 2:
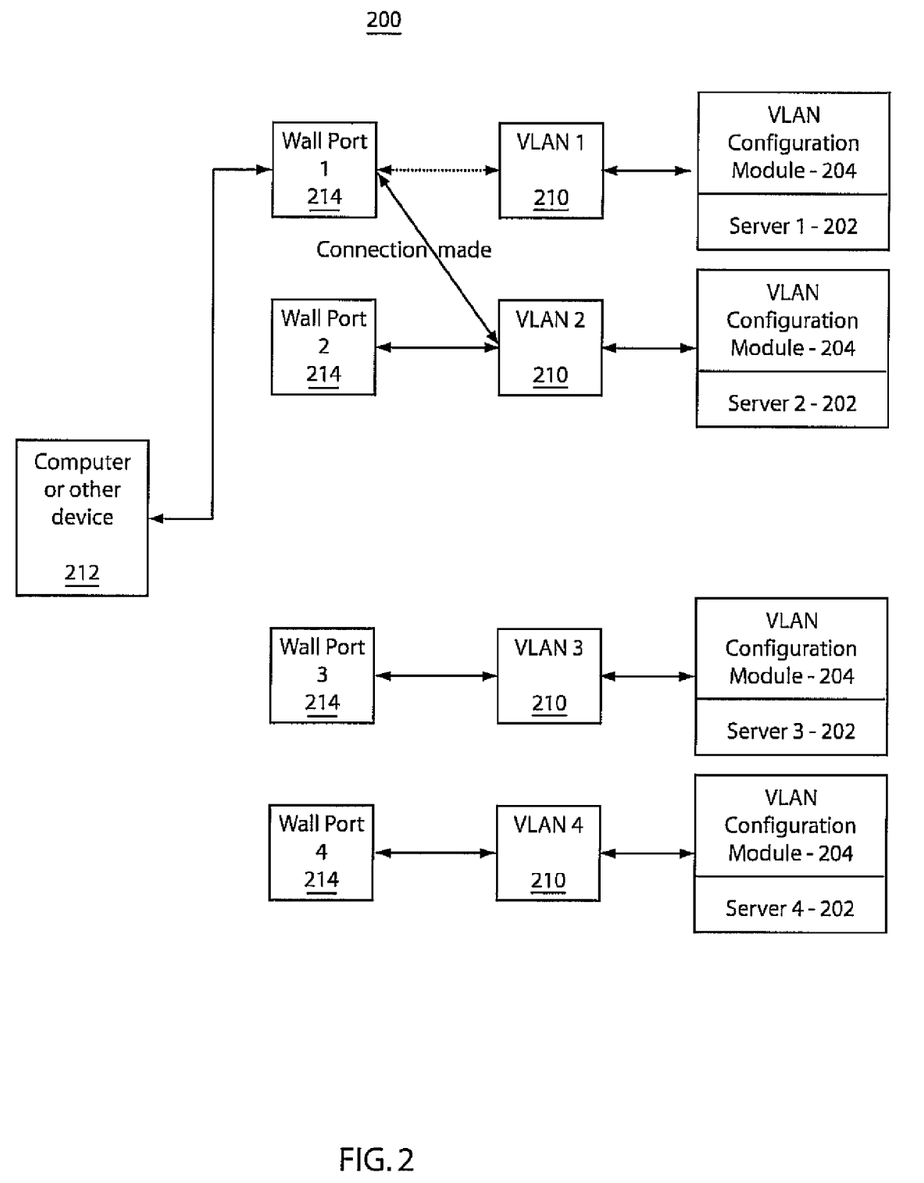
FIG. 2 is a schematic diagram showing a suitable network connection being made to an authorized virtual local area network from a port normally associated with a different virtual local area network in accordance with present principles.

Referring to FIG. 2, in accordance with present principles, a solution is provided whereby a correct VLAN 210 (VLAN 2 in this case) is accessed from a plurality of VLANs 210 and associated with a computer 212, and not with a port 214 to which the computer 212 is attached to. To gain access to a network 200, the computer 212 may employ, e.g., DHCP protocol when the computer first connects to a network, e.g., an IP network. DHCP servers 202 on one VLAN cannot communicate with DHCP servers 202 on another VLAN, since the VLANs provide physical isolation. Physical isolation may be provided between a plurality of servers 202 where each of the servers are isolated from the others, This isolation may include physical isolation or may include isolation based on levels of trust or other criteria. Levels of trust may include a top level corresponding to the layer for the client machines that are not trusted at all, and the bottom level for the machines are completely trusted.

The DHCP servers 202 are computers on the network 200, but are dedicated to the task of listening to requests from new computers (212) on the network and assigning the new computers (212) a network address configuration. Like other computers on the network, the DHCP server 202 can only communicate with, using its network, other computers on the network. However, when a new software stack boots up on a computer 212 and accesses the DHCP server 202, the computer 212 can provide its identifying information to the server 202. Such identifying information can include information about a trusted stack of the computer 212, a signature of the computer's operating system, a machine identification number and/or other information (for a portable device docking on a computer, for example). Some of the information is provided by DHCP specifications, while other information can be provided as extensions to the fields of DHCP by known methods.

In accordance with present principles, each DHCP server 202 is augmented by a VLAN configuration module 204. When a new computer 212 boots up, the following actions may be taken: (i) The computer 212 contacts the DHCP server 202 on a VLAN 210 to which its wall port 214 is connected. For example, a new computer 212 on VLAN 1 contacts the DHCP server 1. (ii) The DHCP server (server 1) contacts the VLAN configuration module 204 with the authentication credentials provided by the computer 212. (iii) The VLAN configuration module 204 determines the wall port (214) from which the request is coming from. (iv) The VLAN configuration module 204 determines the VLAN (VLAN 2) to which the computer 218 using this machine should be assigned (based on security or other criteria). (v) The VLAN configuration module 204 assigns the wall port 214 to the new VLAN (VLAN 2).

In one embodiment, the client machine 212 contacts the DHCP server 1 202 on VLAN 1 210 to get an IP address. The VLAN configuration module 204 on server 1 204 (or a 'global' VLAN configuration module 204 in FIG. 3) disconnects wall port 1 214 from VLAN 1 210 and connects the wall port 1 214 to the appropriate VLAN (e.g., VLAN 2 210) in accordance with the clients credentials, identity, etc. After receiving no response for a preset amount of time, the client 212 sends its request for an IP address again, this time on VLAN 2 210, as the wall port was switched between the first and second client request. The second request arrives at DHCP server 2 which allocates an IP address to the client 212 and responds to the client 212.

DHCP ensures that the client 212 will repeat its attempt to get an IP address several times. The VLAN change should occur before the time-out period of the client, which is typically large enough to allow for several request messages to be lost. Client machines usually make repeated DHCP requests before they get an IP address.

In this embodiment, the server 1 neither responds to the request, nor forwards the request to another DHCP server. Server 1 only forwards the credentials provided by the client to the VLAN configuration module 204 to determine the appropriate VLAN for this client 212 and to reallocate wall port 1 to VLAN 2 210.

In another embodiment, the client machine 212 contacts the DHCP server 1 202 on VLAN 1 210 to get an IP address. The VLAN configuration module 204 on server 1 204 (or the 'global' VLAN configuration module 204 in FIG. 3) determines which is the appropriate VLAN 210 for this client 212 and forwards the request to the DHCP server 202 on this VLAN 210 (e.g., server 2 on VLAN 2).

In this case, the DHCP server 2 202 allocates an IP address to the client 212 and responds to the DHCP server 1 202. The DHCP server 1 202 forwards the response to the client 212 and disconnects the wall port 1 214 connected to the client from VLAN 1 210 and connects the wall port 1 214 to VLAN 2 210. In this instance, the VLAN configuration module 204 may optionally pass the identity of the DHCP server (server 2) on the new VLAN (VLAN 2) to the original DHCP server (server 1).

Figure 3:
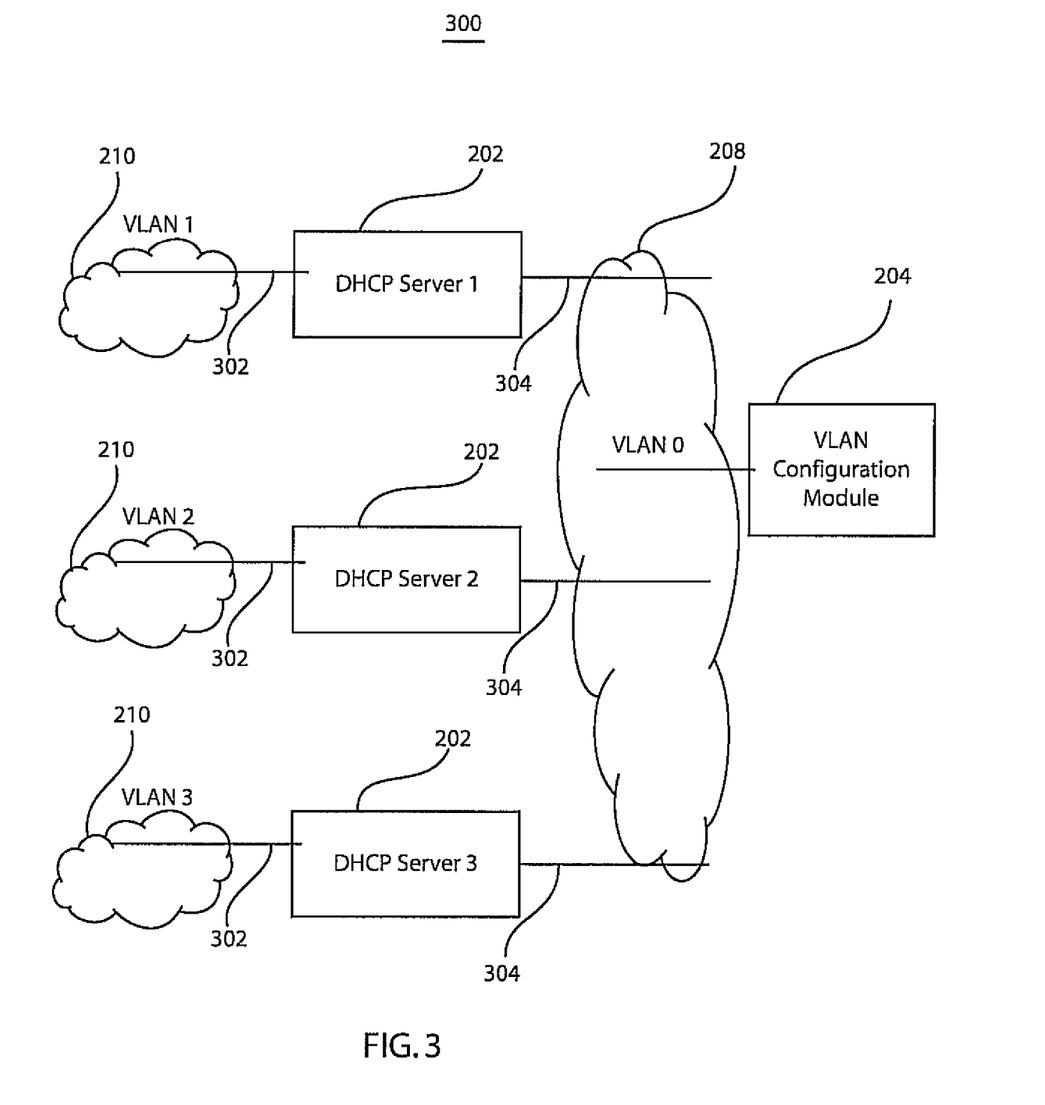
FIG. 3 is a schematic diagram showing a virtual local area network connected to different network servers to provide access for a configuration module in accordance with present principles.

If the servers are on the same VLAN (e.g, VLAN 0 208 of FIG. 3), it is possible for the DHCP server (server 1) to relay a DHCP request to the DHCP server (server 2) on the new VLAN (VLAN 2) (see FIG. 3). A DHCP server responds to the machine it received the request from. However, if servers other then DHCP servers are employed, such as a DHCP server modified to provide additional functionality for this type of environment, the server (server 1) on the original VLAN (VLAN 1) does not expect an answer back from the server (server 2) on the new VLAN (VLAN 2), which can send a response with configuration parameters directly to the client immediately after the VLAN configuration module 204 changes the connection of wall port 214 to VLAN 2. The server (server 2) will handle any further client requests, such as for configuration renewal, release of configuration parameters, etc.

DHCP servers are built such that they either (1) satisfy a client request directly or (2) forward the request to a second DHCP server and forward the response from the second server back to the client. For the second situation to work, the two DHCP servers need to be connected to the same VLAN (208) as shown in FIG. 3, and the second DHCP server should be able to handle future interactions with the client, such as IP address renewal, directly.

Referring to FIG. 3, in one preferred embodiment, the VLAN configuration module 204 is a separate server which is accessible to each of the DHCP servers 202 on a shared VLAN (VLAN 0) 208. Each of the DHCP servers have two interfaces 302 and 304, one of the interfaces 302 belongs to the VLANs 210 on which the interface 302 provides a dynamic IP configuration, and the other interface 304 connects to VLAN 208 on which all the DHCP servers 202 and the VLAN configuration module 204 are connected. As described above, a dynamic interface (302) provides that a computer can be connected at any network access point (e.g., wall port) and be connected to a network 300 at an appropriate server 202 associated with the identity of that particular computer.

The VLAN configuration module 204 has access to all the VLAN switch configurations (e.g., for switches 106 in FIG. 1) and can modify these configurations to assign different ports to different VLANs to permit the dynamic connection to the appropriate server.

Using standard protocols, the above process is reported everytime a DHCP configuration is updated. The VLAN 210 can be switched back to a default VLAN after the expiration of a time-period, which forces the computer to reauthenticate to obtain access to the desired VLAN 206.

The methods described also extend to users bringing in other machines that are unauthorized. For example, if a visitor enters a corporate office and connects his PC to a wall port, the PC is automatically VLAN configured to only connect to the Internet since the user is unauthorized to access any other servers.

In a case where there are multiple PCs connected to the same wall-port, policy rules may be implemented. The policy rules are preferably used to determine the VLAN to which the resulting port should be connected to. The policy of the enterprise may force all users of the same wall-port to go to the most trusted VLAN, the least trusted VLAN, or cut-off access if there are PCs with multiple access requirements on the wall-port.

Present principles may be extended to additional applications. For example, the present principles may be applied for managing network connectivity of migratory Virtual Machines (VMs). VM technology has been developed to permit multiple operating system (OS) images to share the same server (hardware) platform. The physical network adapters are either shared between OS images or dedicated to a particular image, e.g., VM.

Many VM technologies include support for migrating VMs between different servers in a cluster. Recent advances in network technologies permit the migration of VM images over wide area networks, e.g., the Internet. To reduce downtime (time interval while the VM is not available), repetitive pre-copy is used.

VM migration is used for load balancing within or between data centers, and for moving applications (or application runtime environments) between the platforms (or server farms) dedicated to development, testing, or deployment.

Figure 4:
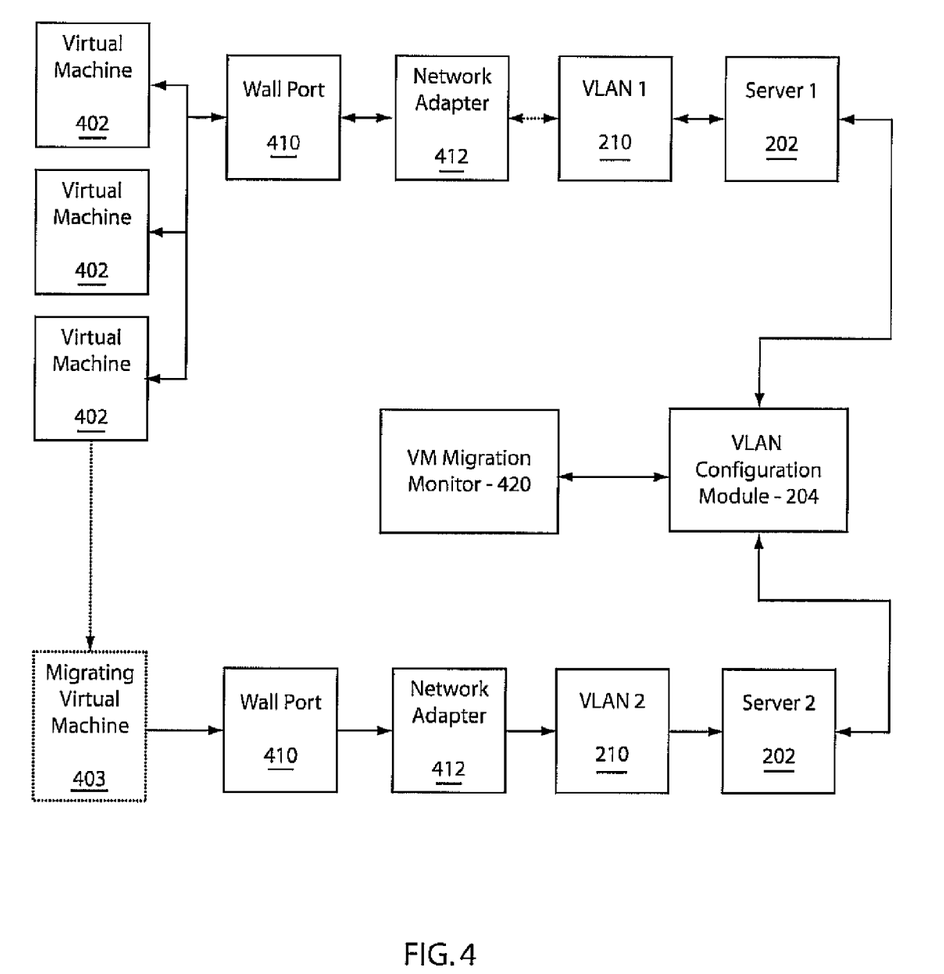
FIG. 4 is a schematic diagram showing virtual machine migration in a data center environment in accordance with present principles.

Referring to FIG. 4, a wall port 410 is connected to a network adapter 412 shared between several virtual machines (VMs) 402. The wall port 410 needs to be allocated to a VLAN 210 satisfying the security requirements of all the VMs 402 sharing the adapter 412. A wall port connected to a network adapter dedicated to one VM needs to be allocated to a VLAN satisfying the security requirements of that VW. However, when any of these VMs 402 migrates (e.g., migrating VM 403) to a different server 202, in the same or different cluster/farm, the allocation of wall ports 410 to VLANs 210 is changed accordingly.

The VLAN configuration module 204 previously described can be employed for managing the dynamic allocation of wall ports 410 to VLANs 210. In this embodiment, in addition to the previously described DHCP servers 202, the VLAN configuration module 204 will interact with a VM migration monitor 420, which is preferably a software component controlling the migration allocation of VMs 402.

If the migrating VM 403 changes its IP address/configuration upon migration to a new server 202, the DHCP server 202 associated with the new server interacts with the VLAN configuration module 204. If the migrating VM 403 doesn't change its IP address/configuration upon migration, the VM migration monitor 402 interacts with the VLAN configuration module 204 to establish the new wall port to VLAN assignment.

Figure 5:
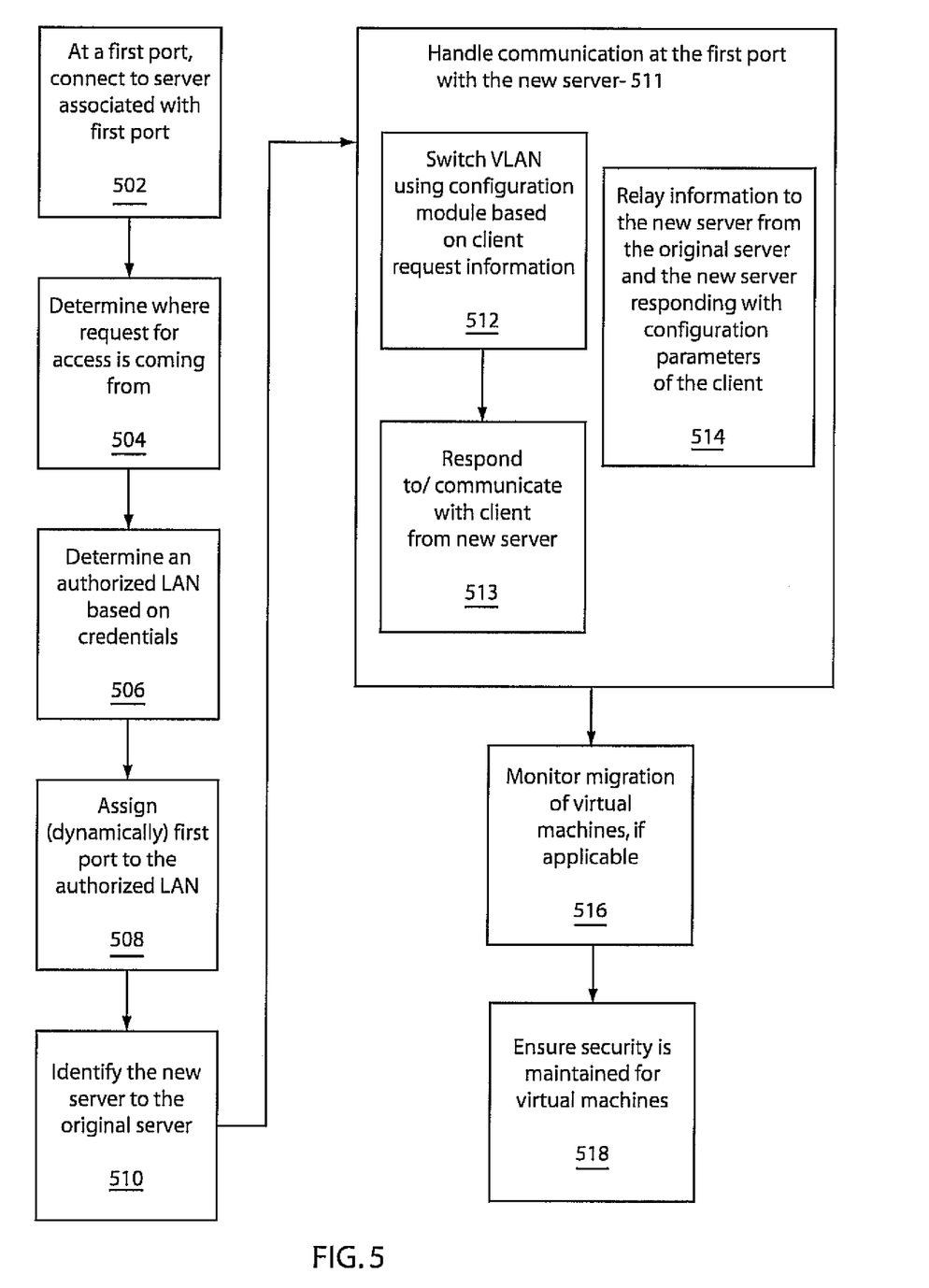
FIG. 5 is a block/flow diagram showing a method for configuring client access to a network in accordance with present principles.

Referring to FIG. 5, a system/method for configuring client access to a network is illustratively shown. In block 502, at a first port, a first server is connected to on a first local area network associated with the first port. In block 504, it is determined where a request for access is coming from (e.g., which wall port). In block 506, an authorized local area network other than the first local area network is determined to which an authorized connection can be properly made (e.g., based on credentials of the device). This may be based on authentication credentials provided by a device requesting access at the first port. The identity and the security level of the access device may be employed to determine the authorized local area network.

In block 508, the first port is assigned to the authorized local area network. This preferably includes dynamically assigning the first port to the authorized local area network based on credentials of a device attempting to access the network.

In block 510, a new server associated with the authorized local area network may be identified to the first (original) server. This step is optional and may be performed in accordance with one embodiment as set forth above.

In block 511, communications are handled with the new server at the first port. In one embodiment, a client machine contacts a DHCP server on a first VLAN to get an IP address. A VLAN configuration module on the original server (or a 'global' VLAN configuration module) disconnects the first wall port from the first VLAN and connects the first wall port to an appropriate VLAN based on the client credentials in block 512. After receiving no response for a preset amount of time, the client sends its request for an IP address again, this time on the second VLAN, as the wall port was switched between the first and second client request. The second request arrives at a new DHCP server which allocates an IP address to the client and responds to the client in block 513.

In block 514, in another embodiment, communications between the original and the new server are permitted (e.g., a common VLAN is employed). This may include authorizing the new server by relaying information to the new server from the first or original server, and the new server responds to the first server with configuration parameters of a client. In this embodiment, the new server is authorized to handle communication at the first wall port only after the first or original server relays the response back to the client. Otherwise, the first server is disconnected from the client before returning the response.

Communications between the new server and the client are maintained. This includes communications between the new server and the client using the appropriate VLAN and server despite the wall port connected to by the client.

In block 516, in a data center environment including virtual machines connecting to the first port, migration of the virtual machines to a different server is monitored to ensure security requirements are maintained. In block 518, maintaining security with respect to the virtual machines includes making sure that a migration of a virtual machine to a different network adapter (or VLAN) does not violate any security rules or policies.

Blocks 504, 506, 508, 510 and 512 are preferably implemented by employing a configuration module. The local area networks are preferably virtual local area networks. Each virtual local area network having a server, preferably a DHCP server associated therewith. Each server is associated with a virtual local area network (VLAN) where the VLANs are physically isolated from one another such that one VLAN cannot communicate with another VLAN. For example, each of the servers is located at different physical layers. Combinations of embodiments and steps may be implemented depending on the application.

Having described preferred embodiments of a system and method for cross-layer virtualized resource configuration (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for configuring client access to a network, comprising:
   at a first port, accessing a first server on a first local area network associated with the first port;
   determining an authorized local area network other than the first local area network to which an authorized connection can be properly made based on information in a client request;
   assigning the first port to the authorized local area network; and
   handling communications with a new client configuration in the authorized local area network, wherein the handling communications with a new client configuration includes responding, by a second server on the authorized local area network, to the client request that was received by but not responded to by the first server.

2. The method as recited in claim 1, wherein handling communications with the new client configuration includes ignoring the client request by the first server and the responding by the second server includes responding to a retransmission of the client request.

3. The method as recited in claim 1, wherein handling communications with the new client configuration includes forwarding the client request to the second server and the second server responding to the client request and subsequent client requests for a configuration.

4. The method as recited in claim 1, wherein handling communications with the new client configuration includes relaying information to a new server from the first server; and
   the new server responding to the first server with configuration parameters of a client, and responding to client requests including configuration parameters.

5. The method as recited in claim 1, wherein determining an authorized local area network to which an authorized connection can be properly made includes providing authentication credentials from a device requesting access at the first port.

6. The method as recited in claim 1, wherein the determining and assigning are performed by a configuration module and wherein the assigning is performed such that further communications on the first port are made with the second server associated with the authorized local area network.

7. The method as recited in claim 1, further comprising providing a plurality of servers, including the first and second servers, each associated with a virtual local area network (VLAN) where the VLANs are isolated from one another such that one VLAN cannot communicate with another VLAN.

8. The method as recited in claim 1, wherein assigning includes dynamically assigning the first port to the authorized local area network based on credentials of a device attempting to access the network.

9. The method as recited in claim 1, wherein the method is performed in a data center environment comprising virtual machines connecting to the first port, the method further comprising:
   monitoring migration of the virtual machines to a different server to ensure security requirements are maintained.

10. A computer program product for configuring client access to a network comprising a non-transitory computer useable medium including a computer readable program, wherein the computer readable program when executed on a computer causes the computer to perform the steps of:
   at a first port, accessing a first server on a first local area network associated with the first port;
   determining an authorized local area network other than the first local area network to which an authorized connection can be properly made based on information in a client request; assigning the first port to the authorized local area network; and handling communications with a new client configuration in the authorized local area network, wherein the handling communications with a new client configuration includes responding, by a second server on the authorized local area network, to the client request that was received by but not responded to by the first server.

11. A system for configuring client access to a network, comprising:
   a plurality of local area networks and each of the local area networks being isolated from the others and each having a server and at least one access port associated therewith; and
   a configuration module configured to determine an authorized local area network from the plurality of local area networks suitable for connection to a device requesting access from a first access port, the configuration module configured to assign the first access port, based on client information in a client request transmitted from the device, to the authorized local area network wherein the authorized local area network is other than the local area network associated with the first access port,
   wherein the server on the authorized local area network is configured to respond to the client request, where the client request is received by the server on the local area network associated with the first access port but not responded to by the server on the local area network associated with the first access port.

12. The system as recited in claim 11, wherein each server includes the configuration module.

13. The system as recited in claim 11, further comprising a global virtual local area network coupled to each server of the plurality of local area networks such that the configuration module accesses the servers through the virtual local area network.

14. The system as recited in claim 11, wherein the device requesting access from a first access port includes a portable device accessing a computer connected to the first access port.

15. The system as recited in claim 11, wherein the local area networks include virtual local area networks.

16. The system as recited in claim 11, wherein each server implements a Dynamic Host Configuration Protocol (DHCP) protocol.

17. The system as recited in claim 11, wherein local area networks are associated with a security level and access is granted to each local area network in accordance with an identity and authorization of the device requesting access.

18. The system as recited in claim 11, wherein the device requesting access includes one or more virtual machines in a data center environment.

19. The system as recited in claim 18, wherein the one or more virtual machines are selectively connected to one or more of the local area networks by network adapters.

20. The system as recited in claim 18, further comprising a migration monitor coupled to the configuration module, the migration monitor configured to provide access control for virtual machines migrating between local area networks.

\* \* \* \* \*